(12) United States Patent
Kim et al.

(10) Patent No.: US 8,938,049 B2
(45) Date of Patent: Jan. 20, 2015

(54) MESH ELECTRODE ADHESION STRUCTURE, ELECTRON EMISSION DEVICE AND ELECTRONIC APPARATUS INCLUDING THE ELECTRON EMISSION DEVICE

(71) Applicant: Samsung Electronics Co., Ltd., Suwon-si, Gyeonggi-do (KR)

(72) Inventors: Do-yoon Kim, Hwaseong-si (KR); Yong-chul Kim, Seoul (KR); Il-hwan Kim, Seoul (KR); Shang-hyeun Park, Yongin-si (KR); Tae-won Jeong, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 63 days.

(21) Appl. No.: 13/893,519

(22) Filed: May 14, 2013

(65) Prior Publication Data
US 2014/0010347 A1    Jan. 9, 2014

(30) Foreign Application Priority Data

Jul. 6, 2012   (KR) .................. 10-2012-0074107

(51) Int. Cl.
*H01J 35/06* (2006.01)
*H01J 29/50* (2006.01)
(Continued)

(52) U.S. Cl.
CPC ............... *H01J 19/24* (2013.01); *H01J 35/065* (2013.01); *H01J 1/02* (2013.01); *H01J 35/06* (2013.01); *H01J 3/021* (2013.01); *H01J 31/127* (2013.01); *H01J 63/02* (2013.01); *H01J 9/02* (2013.01); *H01J 63/06* (2013.01);
(Continued)

(58) Field of Classification Search
USPC ........... 378/91, 113, 119, 122, 134, 136, 138, 378/210; 250/396 R, 397, 423 R, 423 F, 250/493.1, 494.1, 503.1, 526; 313/399, 313/409, 414–417, 441, 446, 447, 452, 456, 313/457, 238, 243, 244, 252, 268, 292–302, 313/304
See application file for complete search history.

(56) References Cited

U.S. PATENT DOCUMENTS 7,456,564 B2   11/2008   Song et al.
7,704,117 B2   4/2010    Jung et al.

FOREIGN PATENT DOCUMENTS

KR    1020020007495 A    1/2002
KR    1020040069506 A    8/2004
(Continued)

OTHER PUBLICATIONS

Kwang-Bok Kim et al., "Efficient electron emissions from printed carbon nanotubes by surface treatments", Journal of Vacuum Science and Technology, B22, 1331 (2004).
(Continued)

*Primary Examiner* — Anastasia Midkiff
(74) *Attorney, Agent, or Firm* — Cantor Colburn LLP

(57) ABSTRACT

A mesh electrode adhesion structure includes: a substrate, and an opening defined in the substrate; a mesh electrode on the substrate, and a first combination groove defined in the mesh electrode; and an adhesion layer between the substrate and the mesh electrode. The mesh electrode includes: a mesh region corresponding to the opening defined in the substrate, and an adhesion region in which the first combination groove exposes the adhesion layer.

29 Claims, 5 Drawing Sheets

(51) Int. Cl.
  *H01J 19/24* (2006.01)
  *H01J 1/02* (2006.01)
  *H01J 3/02* (2006.01)
  *H01J 31/12* (2006.01)
  *H01J 63/02* (2006.01)
  *H01J 9/02* (2006.01)
  *H01J 63/06* (2006.01)
  *B82Y 99/00* (2011.01)

(52) U.S. Cl.
  CPC ..... *H01J 2235/062* (2013.01); *H01J 2235/068* (2013.01); *B82Y 99/00* (2013.01); *Y10S 977/939* (2013.01); *H01J 2203/0208* (2013.01); *H01J 2329/4608* (2013.01)

USPC ............ 378/136; 378/122; 313/417; 977/939

(56) References Cited

FOREIGN PATENT DOCUMENTS

KR    1020060087706 A    8/2006
KR    1020060095156 A    8/2006

OTHER PUBLICATIONS

Woo-Sung Cho et al., "Carbon Nanotube-Based Triode Field Emission Lamps Using Metal Meshes With Spacers", IEEE Electron Device Letters, vol. 28, No. 5, May 2007, pp. 386-388.

MESH ELECTRODE ADHESION STRUCTURE, ELECTRON EMISSION DEVICE AND ELECTRONIC APPARATUS INCLUDING THE ELECTRON EMISSION DEVICE

CROSS-REFERENCE TO RELATED APPLICATIONS

This application claims priority to Korean Patent Application No. 10-2012-0074107, filed on Jul. 6, 2012, and all the benefits accruing therefrom under 35 U.S.C. §119, the disclosure of which is incorporated herein in its entirety by reference.

BACKGROUND

1. Field

Provided are a mesh electrode adhesion structure, an electron emission device, and an electronic apparatus including the electron emission device, and more particularly, an electron emission device, where adhesion of a mesh electrode is reinforced, and an electronic apparatus including the electron emission device.

2. Description of the Related Art

An X-ray generating apparatus having a triode structure, a field emission display, a backlight unit or the like uses an electron emission device including a cathode and a gate electrode. In order for the electron emission device to operate, a high electric field is required, but the high electric field may adversely affect structural stability between the cathode and the gate electrode inducing a voltage.

SUMMARY

Provided are a mesh electrode adhesion structure, where a mesh electrode is stably adhered to a substrate, an electron emission device, and an electronic apparatus including the electron emission device.

Additional aspects will be set forth in part in the description which follows and, in part, will be apparent from the description, or may be learned by practice of the presented embodiments.

Provided is a mesh electrode adhesion structure which includes: a substrate, and an opening defined in the substrate; a mesh electrode on the substrate, and a first combination groove defined in the mesh electrode; and an adhesion layer between the substrate and the mesh electrode. The mesh electrode includes: a mesh region corresponding to the opening defined in the substrate, and an adhesion region in which the first combination groove exposes the adhesion layer.

An upper width and a lower width of the first combination groove may be different from each other. The upper width may be larger than the lower width.

An angle between an inner wall of the mesh electrode at the first combination groove and the adhesion layer may be in a range from about 90 degrees (°) to about 130°.

The first combination groove may be circular or polygonal shaped in a plan view.

The mesh electrode adhesion structure may further include a second combination groove defined in the adhesion region of the mesh electrode. A width of the first combination groove may be different from a width of the second combination groove.

The adhesion layer may include a protruded portion extending into the first combination groove and combined to an inner wall of the mesh electrode at the first combination groove.

The adhesion layer may include a glass material. The adhesion layer may include glass frit or bulk metal glass.

The mesh electrode may include a conductive metal, for example, an invar metal.

Provided is an electron emission device which includes: a cathode; an insulation layer on the cathode, and an opening defined in the insulation layer and exposing the cathode; an electron emission source on the cathode and in the opening defined in the insulation layer; a mesh electrode on the insulation layer, and a combination groove defined in the mesh electrode; and an adhesion layer between the insulation layer and the mesh electrode. The mesh electrode includes a mesh region corresponding to the opening defined in the insulating layer, and an adhesion region in which the combination groove exposes the adhesion layer.

The electron emission source may include carbon nanotubes.

The mesh electrode may further include a plurality of mesh regions, and a first adhesion region between the plurality of mesh regions, in an overall mesh region of the mesh electrode; a second adhesion region outside the overall mesh region; a first combination groove in the first adhesion region, and a second combination groove in the second adhesion region.

The shapes or sizes of the first combination groove and second combination groove may be different from each other.

Provided is an electron emission device which includes: a cathode; an insulation layer on the cathode, and an opening defined in the insulation layer and exposing the cathode; an electron emission source on the cathode and in the opening defined in the insulation layer; a gate electrode on the insulation layer, and a combination groove defined in the gate electrode; and an adhesion layer between the insulation layer and the gate electrode. The gate electrode includes an opening region corresponding to the opening defined in the insulation layer, and an adhesion region in which the combination groove exposes the adhesion layer.

Provided is an electronic apparatus which includes an electron emission device which emits an electron beam; and an anode spaced apart from the electron emission device. The anode emits light according to a collision with the electron beam emitted from the electron emission device. The electron emission device includes: a cathode; an insulation layer on the cathode, and an opening defined in the insulation layer and exposing the cathode; an electron emission source on the cathode and in the opening defined in the insulation layer; a mesh electrode on the insulation layer, and a combination groove defined in the mesh electrode; and an adhesion layer between the insulation layer and the mesh electrode. The mesh electrode includes: a mesh region corresponding to the opening defined in the insulation layer and through which the electron beam is emitted toward the anode, and an adhesion region in which the combination groove exposes the adhesion layer.

The anode may emit an X-ray, and the electronic apparatus is an X-ray emission apparatus. The X-ray emitted from the anode may penetrate a target object, and the electronic apparatus may further include an imaging unit which photographs the X-ray that penetrated through the target object.

A substrate structure of the electronic apparatus includes the anode, and a fluorescent layer on a surface of the anode, and emits a visible ray. The electronic apparatus is a surface light source apparatus which emits the visible ray.

A substrate structure of the electronic apparatus includes the anode, and a fluorescent layer on a surface of the anode, and emits a visible ray. The electronic apparatus is a display apparatus including a pixel array, and the pixel array includes the cathode of the electron emission device independently operating according to pixels of the display apparatus.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
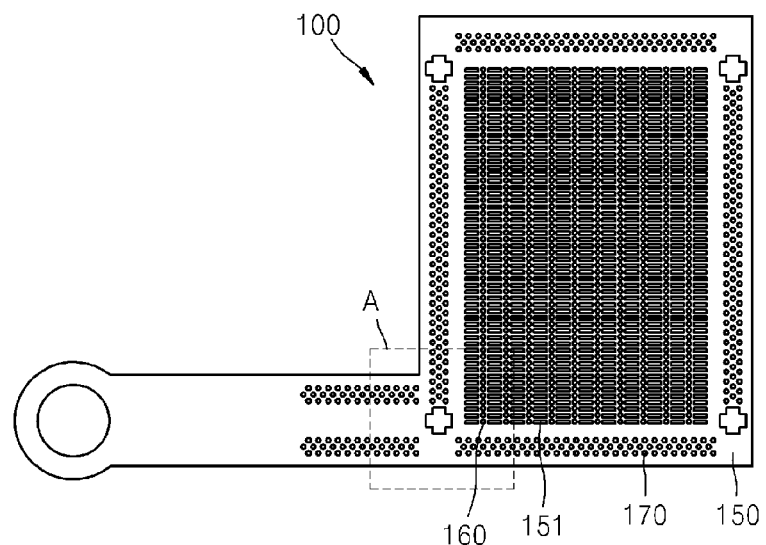
FIG. 1 is a plan view of an embodiment of an electron emission device according to the present invention.

Reference will now be made in detail to embodiments, examples of which are illustrated in the accompanying drawings, where like reference numerals refer to like elements throughout and sizes and thicknesses of elements may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

In order for an electron emission device to operate, a high electric field is used, but the high electric field may adversely affect structural stability between the cathode and the gate electrode inducing a voltage. For example, a mesh electrode having an electron emission passage in a mesh shape is used as the gate electrode of the electron emission device, and the mesh electrode may adhere to the cathode after being detached from an insulation layer due to the high electric field. Therefore, there remains a need for an improved electrode structure having structural stability with respect to a high electric field used by the electron emission device.

Figure 2:
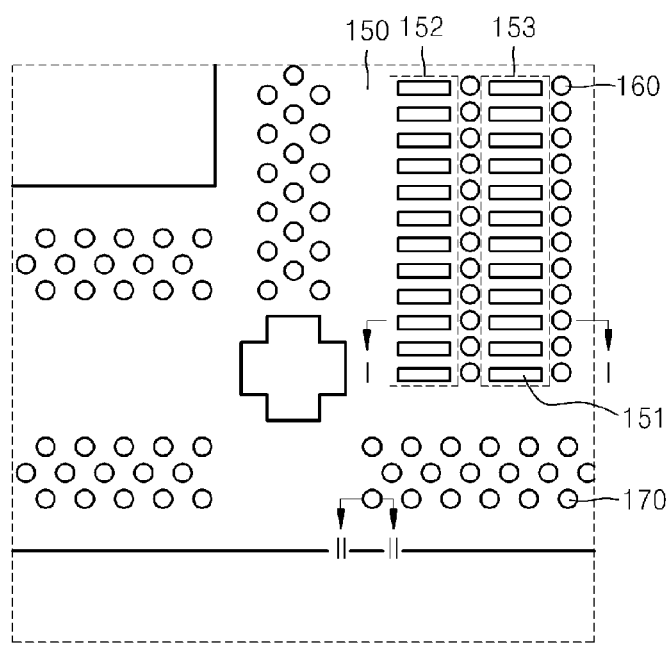
FIG. 2 is a magnified view of an embodiment of a mesh electrode adhesion structure in region A of the electron emission device of FIG. 1.
Figure 3:
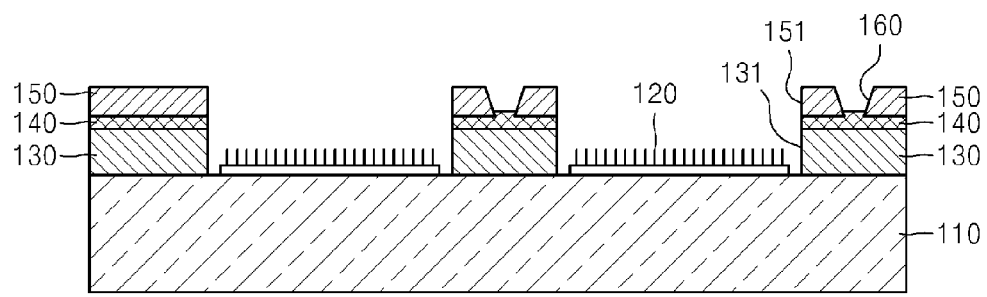
FIG. 3 is a partial cross-sectional view taken along line I-I of FIG. 2.
Figure 4:
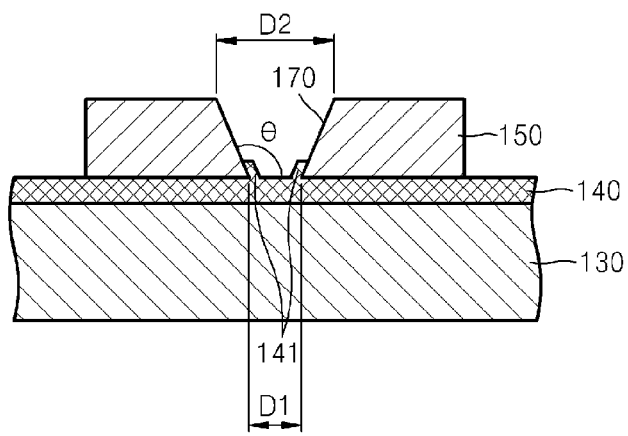
FIG. 4 is a partial cross-sectional view taken along line II-II of FIG. 2.

FIG. 1 is a plan view of an embodiment of an electron emission device 100 according to the present invention, FIG. 2 is a magnified view of an embodiment of a mesh electrode adhesion structure in region A of the electron emission device 100 of FIG. 1, FIG. 3 is a partial cross-sectional view taken along line I-I of FIG. 2, and FIG. 4 is a partial cross-sectional view taken along line II-II of FIG. 2.

Referring to FIGS. 1 through 4, the electron emission device 100 according to the illustrated embodiment includes a cathode 110, an electron emission source 120, an insulation layer 130 and a mesh electrode (or gate electrode) 150.

The cathode 110 may include a conductive metal, such as an invar metal.

The electron emission source 120 may include carbon nanotubes, but is not limited thereto or thereby. The electron emission source 120 may be on the cathode 110. The carbon nanotubes of the electron emission source 120 may be adhered to the cathode 110 such as via a paste method. The electron emission source 120 may include a plurality of portions respectively disposed in several regions on a top surface of the cathode 110.

The insulation layer 130 includes an insulation material and is disposed in a region excluding a region where the electron emission source 120 is disposed, on the top surface of the cathode 110. An opening 131 is defined in the insulation layer 130 and corresponding to the region where the electron emission source 120 is disposed. A cross-sectional height (e.g., thickness) of the insulation layer 130 is greater higher than a cross-sectional height (e.g., thickness) of the electron emission source 120. The heights may be taken perpendicular to the top surface of the cathode 110. In one embodiment, for example, a total thickness of the electron emission source 120 using the carbon nanotubes may be from about 4 micrometers (μm) to about 5 μm on average, and a thickness of the insulation layer 130 may be about 50 μm.

The insulation layer 130 may include a material having insulation characteristics. In an embodiment of manufacturing the electron emission device, the insulation layer 130 may be formed by patterning a paste having an insulation characteristic, e.g., $SiO_2$, on a top surface of the cathode 110 such as via a screen print method.

The mesh electrode 150 is disposed on a top surface of the insulation layer 130. As shown in FIG. 2, the mesh electrode 150 may include first and second mesh regions 152 and 153 each including a plurality of electron emission passages 151. An electron emission passage 151 may be a discrete pattern, and may have a relatively long, uniform width striped-shape in the plan view. The electron emission passages 151 are openings defined in the mesh electrode 150. The electron emission passage 151 may be elongated in a first direction, where a width is defined in a second direction perpendicular to the first direction. As illustrated in FIG. 2, a group of electron emission passages 151 of a mesh region may be arranged in the second direction, but is not limited thereto or thereby.

Each of the first and second mesh regions 152 and 153 corresponds to or is aligned with a region where the electron emission source 120 is disposed. Here, the first mesh region 152 of the mesh electrode 150 corresponds to a region of the openings 131 of the insulation layer 130 indicated by the dotted outline shown in FIG. 2. The opening 131 and the electron emission passage 151 expose the electron emission source 120. The opening 131 and the electron emission passage 151 may be aligned, but are not limited thereto or thereby, as long as passage is provide from the electron emission source 120 to outside of the electron emission device 100. The mesh electrode 150 may include a conductive metal. In an embodiment of manufacturing the electron emission device, the mesh electrode 150 may be formed, for example, by patterning an invar metal plate via a laser or spray etch method. Since the openings 131 defined in the insulation layer 130 are located below the first mesh region 152 of the mesh electrode 150, the first mesh region 152 of the mesh electrode 150 may be considered as floating.

First combination grooves 160 are disposed between the first and second mesh regions 152 and 153 of the mesh electrode 150. The first combination grooves 160 may be holes which are defined in and extended through a thickness of the mesh electrode 150. Inner walls of the mesh electrode 150 are exposed at the first combination grooves 160. As shown in FIG. 3, the insulation layer 130 is disposed below a region between the first and second mesh regions 152 and 153 of the mesh electrode 150. The region of the mesh electrode 150 between the first and second mesh regions 152 and 153 may be referred to as an adhesion region. An adhesion layer 140 may be disposed in the adhesion region, and between the mesh electrode 150 and the insulation layer 130, to adhere the mesh electrode 150 and the insulation layer 130 to each other. The first combination groove 160 is in the adhesion region of the mesh electrode 150 between the first and second mesh regions 152 and 153, and exposes the adhesion layer 140 in the adhesion region. The adhesion layer 140 may include a glass material, such as glass frit or bulk metal glass, or insulation ceramics, but is not limited thereto or thereby.

Second combination grooves 170 may be defined in another adhesion region of the mesh electrode 150, and disposed outside an entire or overall mesh region of the mesh electrode 150. The overall mesh region may include the first and second mesh regions 152 and 153, and the adhesion region between the first and second mesh regions 152 and 153. The second combination grooves 170 may also be holes which are defined in and extended through a thickness of the mesh electrode 150. Inner walls of the mesh electrode 150 are exposed at the second combination grooves 170. An area for the first combination grooves 160 may be less than an area for the second combination grooves 170. Since the second combination grooves 170 may be disposed in a wider space than the first combination grooves 160, sizes and shapes of the second combination grooves 170 may not be identical to those of the first combination grooves 160. In embodiments of the present invention, for example, planar sizes or dimensions of the second combination grooves 170 may be larger than those of the first combination grooves 160. As illustrated in FIG. 2, the first and second combination grooves 160 and 170 have a circular shape in the plan view. However, the planar shapes of the first and second combination grooves 160 and 170 may be different from each other. In one embodiment, for example, a diameter of the first combination groove 160 may be from about 80 μm to about 100 μm, whereas a diameter of the second combination groove 170 may be about 200 μm. In an alternatively embodiment, one of the first and second combination grooves 160 and 170 may be omitted.

In a cross-section, dimensions at an upper groove area and a lower groove area of the first and second combination grooves 160 and 170 may be different from each other. Alternatively, an angle θ between the adhesion layer 140 and each of inner walls of the mesh electrode 150 at the first and second combination grooves 160 and 170 may be from about 90 degrees (°) to about 130°. In one embodiment, for example, as shown in FIG. 4, the angle θ between the adhesion layer 140 and the inner wall of the mesh electrode 150 at the second combination groove 170 may be larger than 90° such that an upper diameter D2 of the second combination groove 170 is larger than a lower diameter D1 in the second combination groove 170. Here, the combination groove may have an overall truncated conical shape. Of course, the illustrated embodiment does not eliminate an embodiment where dimensions at the upper groove area and the lower groove area of a combination groove are the same. In other words, the first and second combination grooves 160 and 170 may have an overall cylindrical shape.

Figure 5A:
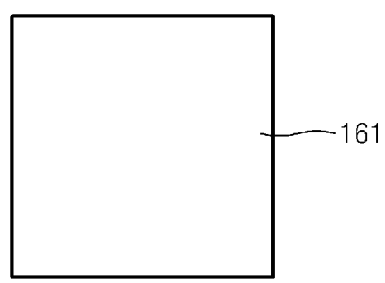
FIGS. 5A and 5B illustrate embodiments of shapes of combination grooves of a mesh electrode adhesion structure, according to the present invention.
Figure 5B:
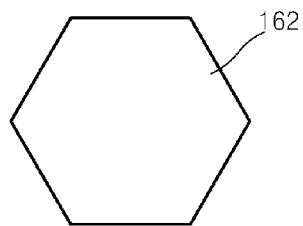

However, overall shapes of the first and second combination grooves 160 and 170 are not limited to the cylindrical or truncated conical shapes. As illustrated in FIG. 2, the first and second combination grooves 160 and 170 have a circular shape in the plan view. According to alternative embodiments, the first and second combination grooves 160 and 170 may have a quadrangular shape 161 as shown in FIG. 5A, a hexagonal shape 162 as shown in FIG. 5B, any other polygonal shapes or oval shapes, in the plan view. Dimensions at the upper groove area and the lower groove area of a combination groove having these planar shapes may be different from each other or may be the same as each other, as described above.

The first and second combination grooves 160 and 170 of the mesh electrode 150 reinforce adhesion between the mesh electrode 150 and the adhesion layer 140, such that the mesh electrode 150 is stably adhered to the insulation layer 130 via the adhesion layer 140. In one embodiment, for example, when the adhesion layer 140 is coated and the mesh electrode 150 is adhered thereon such as to perform a plasticization process while manufacturing the electron emission device 100, some of the adhesion layer 140 (e.g., including a glass material) rises along the inner walls of the mesh electrode 150 at the first and second combination grooves 160 and 170, thereby reinforcing the adhesion between the mesh electrode 150 and the adhesion layer 140. In other words, when the mesh electrode 150 is adhered to the insulation layer 130, e.g., a substrate, in the illustrated embodiment, not only is a surface-surface adhesion between the mesh electrode 150 and the insulation layer 130 obtained by the adhesion layer 140, but a stronger adhesion between the mesh electrode 150 and the insulation layer 130 is also obtained via a geometrical combination of the first and second combination grooves 160 and 170, and the adhesion layer 140.

As described above, when dimensions of the upper groove areas are larger than the lower groove areas of the first and second combination grooves 160 and 170 or when the angles θ between the adhesion layer 140 and the inner walls of the mesh electrode 150 at the first and second combination grooves 160 and 170 are higher than 90°, some of the adhesion layer 140 protrudes into the respective combination groove. Referring to FIG. 4, a portion 141 of the adhesion layer 140 protruded in to the second combination groove 170. This protruded portion 141 of the adhesion layer 140 combines to the inner walls of the mesh electrode 150 at the first and second combination grooves 160 and 170 such as during the plasticization process. Since the protruded portion 141 is continuous with a remainder of the adhesion layer 140, the adhesion between the mesh electrode 150 and the insulation layer 130 and thereby between the mesh electrode 150 and the insulation layer 130, is increased.

As described above, the opening 131 defined in the insulation layer 130 is disposed below the first and second mesh regions 152 and 153 of the mesh electrode 150, and thus the first and second mesh regions 152 and 153 float. In such a structure, according to the related art, when a high voltage is applied to a mesh electrode, the mesh electrode may be detached from an underlying insulation layer. However, according to the illustrated embodiment of the present invention, the adhesion of the mesh electrode 150 to the insulation layer 130 is reinforced by defining the first and second combination grooves 160 and 170 in the mesh electrode 150, and thus the mesh electrode 150 of a mesh type is stably adhered to the insulation layer 130 via the adhesion layer 140.

Figure 6:
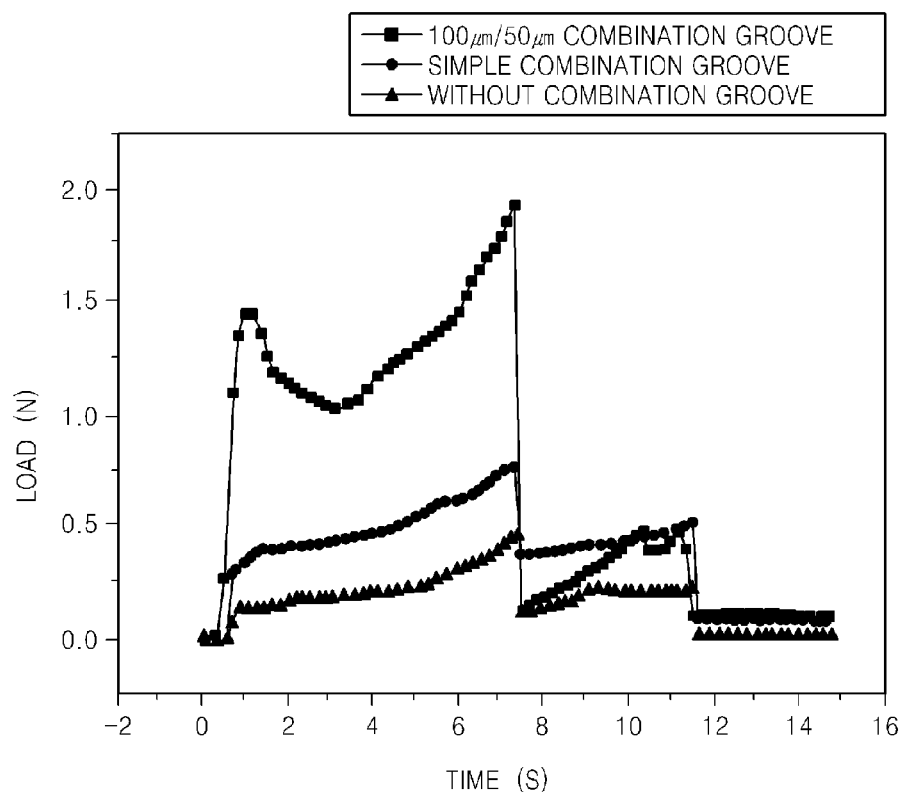
FIG. 6 is a graph of adhesion between a mesh electrode and an insulation layer of an electron emission device based on the existence of a combination groove in the electron emission device, where the adhesion is shown as a load in newtons (N) according to time in seconds (S)

FIG. 6 is a graph showing results of adhesion measured via a peel test for separating the mesh electrode 150 and the insulation layer 130 of an electron emission from each other after adhering the mesh electrode 150 to the insulation layer 130 to each other by using glass frit (e.g., the adhesion layer 140). The adhesion was measured for an embodiment of an electron emission device 100 according to the present invention including combination grooves (e.g., the first and second combination grooves 160 and 170 of FIG. 2 defined in the mesh electrode 150) having an upper diameter of 100 μm and a lower diameter of 50 μm (--■--), an embodiment of an electron emission device 100 according to the present invention including simple combination grooves having the same upper and lower diameters (--●--), and a comparative embodiment of an electron emission device not including any combination grooves (--▲--).

Based on a maximum load value, adhesion of a mesh electrode having the simple combination grooves is 1.64 times higher than that of a mesh electrode without combination grooves. Furthermore, adhesion of a mesh electrode including combination grooves having an upper diameter of 100 μm and a lower diameter of 50 μm is 4.24 times higher than that of the mesh electrode without combination grooves. As such, by increasing adhesion between a mesh electrode and an insulation layer, structural stability between the mesh electrode and the cathode may be increased.

Figure 7:
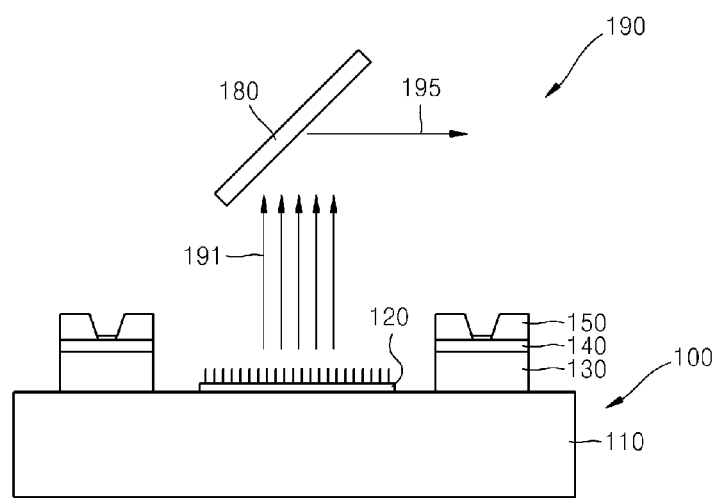
FIG. 7 is a schematic diagram of an embodiment of an X-ray emission apparatus employing the electron emission device of FIG. 1.

FIG. 7 is a schematic diagram of an embodiment an X-ray emission apparatus 190 employing the electron emission device 100 of FIG. 1.

Referring to FIG. 7, the X-ray emission apparatus 190 according to the illustrated embodiment includes the electron emission device 100 and an anode 180. The electron emission device 100 may be any one of the electron emission devices 100 described above with reference to FIGS. 1 through 6. The anode 180 converts electrons 191 emitted from the electron emission device 100 into an X-ray 195. The anode 180 includes a target including of a metal, such as molybdenum (Mo), silver (Ag), tungsten (W), chromium (Cr), iron (Fe), cobalt (Co), or copper (Cu) or a metal alloy thereof. The electron emission device 100 and the anode 180 may be each connected to an external power supply unit (not shown). The electron emission device 100 and the anode 180 may be provided in a sealed container (not shown) whose inner portion is maintained in a vacuum state. The sealed container may include a window through which the X-ray 195 from the inner portion is emitted to an outer portion thereof. The sealed container may include stainless steel such that a region excluding the window blocks the X-ray 195.

Figure 8:
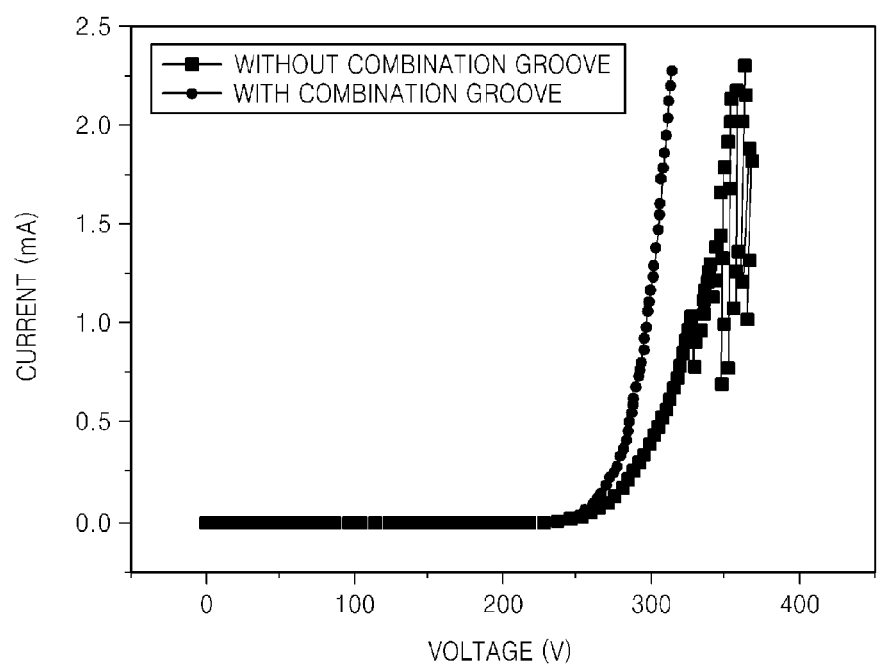
FIG. 8 is a graph showing a change in an anode current in milliamps (mA) according to a gate voltage in voltage (V) based on existence of a combination groove in the X-ray emission apparatus of FIG. 7.

FIG. 8 is a graph showing a change in electrical current in milliamps (mA) in an anode according to a driving voltage in volts (V), in the X-ray emission apparatus. The change in electrical current is shown for the X-ray emission apparatus 190 including an embodiment of the electron emission device 100 of the present invention (e.g., with combination grooves) (--■--), and for an X-ray emission apparatus including a comparative example of an electron emission device without combination grooves (--●--). Referring to FIG. 8, the X-ray emission apparatus 190 including the electron emission device 100 according to the present invention shows a substantially stable field emission, whereas the X-ray emission apparatus including the comparative example of the electron emission device without combination grooves shows unstable field emission. The unstable field emission in the X-ray emission apparatus including the comparative example of the electron emission device may be generated due to a leakage current in a mesh electrode as the mesh electrode is partially detached in the electron emission device not having a combination groove. Accordingly, the X-ray emission apparatus 190 employing the electron emission device 100 of the present invention may emit a more stable X-ray, and thus a more reliable image may be applied when the X-ray emission apparatus 190 is applied to an X-ray imaging apparatus or the like.

Figure 9:
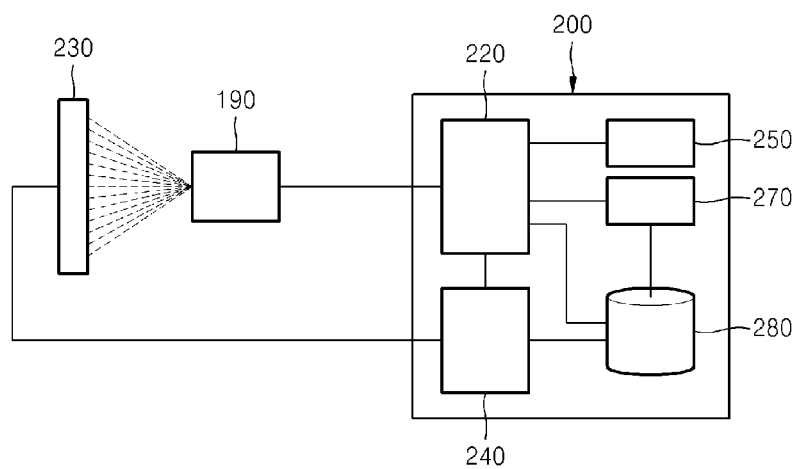
FIG. 9 is a schematic diagram of an embodiment of an X-ray imaging apparatus employing the X-ray emission apparatus of FIG. 7.

FIG. 9 is a schematic diagram of an embodiment of an x-ray imaging apparatus 200 employing the X-ray emission apparatus of FIG. 7.

Referring to FIG. 9, the X-ray imaging apparatus 200 according to the present invention include the X-ray emission apparatus 190, a controller 220 controlling the X-ray imaging apparatus 200, an imaging unit 230 photographing an X-ray that is emitted from the X-ray emission apparatus 190 and passed through a target object, an image processor 240 processing image information captured by the imaging unit 230, an input unit 250 into which user manipulation is input, an output unit 270 outputting the processed image information and a data storage unit 280 storing various pieces of information including the image information. Since elements of the X-ray imaging apparatus 200 excluding the X-ray emission apparatus 190 are well known, detailed descriptions thereof are omitted herein.

Figure 10:
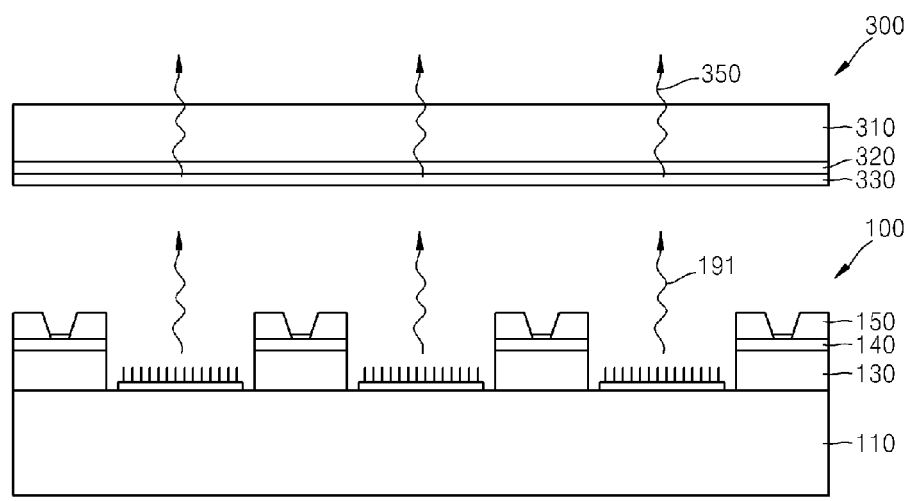
FIG. 10 is a diagram of an embodiment of a surface light source apparatus employing the electron emission device of FIG. 1.

FIG. 10 is a diagram of an embodiment of a field emission device ("FED") 300 that is used as a surface light source device, according to the present invention.

Referring to FIG. 10, the FED 300 according to the illustrated embodiment includes an electron emission device 100, and a substrate structure. The substrate structure includes a transparent substrate 310, and an anode layer 320 and a fluorescent layer 330 on the transparent substrate 310. The electron emission device 100 may be any one of the electron emission devices 100 described above with reference to FIGS. 1 through 6.

The transparent substrate 310 is disposed to face an electron emitting surface (e.g., a surface where the mesh electrode 150 is disposed) of the electron emission device 100 while being spaced apart from the electron emitting surface at a predetermined interval. The fluorescent layer 330 includes a cathode luminescence ("CL") type fluorescent material that is excited by electrons 191 emitted and accelerated from the electron emission device 100, and generates visible light. The electrons 191 emitted from the electron emission device 100 collide with the fluorescent layer 330 and turn into a visible ray 350. In an alternative embodiment, a stacking order of the anode layer 320 and the fluorescent layer 330 may be switched. The electron emission device 100 and substrate structure including the transparent substrate 310, the anode layer 320 and the fluorescent layer 330 may have a sealed structure. In one embodiment, the electron emission device 100 and the substrate structure may be provided in a sealed container (not shown).

The FED 300 may be used as a surface light source of a backlight unit ("BLU") or lighting apparatus of a display apparatus which is not self-emissive, such as a liquid crystal display ("LCD"). The FED 300 may be used as an image display apparatus. In one embodiment, for example, when the cathode 110 of the electron emission device 100 is integrally driven with the FED 300, the FED 300 may operate as a surface light source device. A pixel array may include the cathode 110 of the electron emission device 100 and may independently operate according to pixels of the display apparatus, such that the FED 300 may operate as a display apparatus displaying an image.

As described above, according to one or more of the above embodiments of the present invention, a mesh electrode adhesion structure may have reinforced adhesion to a substrate via separate combination grooves defined in the mesh electrode. By using the mesh electrode adhesion structure as a gate electrode of an electron emission device, the gate electrode may be stably adhered to an insulation layer even in a high electric field.

It should be understood that the embodiments described therein should be considered in a descriptive sense only and not for purposes of limitation. Descriptions of features or aspects within each embodiment should typically be considered as available for other similar features or aspects in other embodiments.

What is claimed is:

1. A mesh electrode adhesion structure comprising:
 a substrate, and an opening defined in the substrate;
 a mesh electrode on the substrate, and a first combination groove defined in the mesh electrode; and
 an adhesion layer between the substrate and the mesh electrode;
 wherein the mesh electrode comprises:
   a mesh region corresponding to the opening defined in the substrate, and
   an adhesion region in which the first combination groove exposes the adhesion layer.

2. The mesh electrode adhesion structure of claim 1, wherein an upper width and a lower width of the first combination groove are different from each other.

3. The mesh electrode adhesion structure of claim 2, wherein the upper width of the first combination groove is larger than the lower width thereof.

4. The mesh electrode adhesion structure of claim 1, wherein an angle between an inner wall of the mesh electrode at the first combination groove and the adhesion layer is in a range from about 90 degrees to about 130 degrees.

5. The mesh electrode adhesion structure of claim 1, wherein the first combination groove is circular-shaped or polygonal-shaped in a plan view.

6. The mesh electrode adhesion structure of claim 1, further comprising a second combination groove defined in the adhesion region of the mesh electrode,
 wherein a width of the first combination groove is different from a width of the second combination groove.

7. The mesh electrode adhesion structure of claim 1, wherein the adhesion layer comprises a protruded portion extending into the first combination groove and combined to an inner wall of the mesh electrode at the first combination groove.

8. The mesh electrode adhesion structure of claim 1, wherein the adhesion layer comprises a glass material.

9. The mesh electrode adhesion structure of claim 8, wherein the adhesion layer comprises glass frit or bulk metal glass.

10. The mesh electrode adhesion structure of claim 1, wherein the mesh electrode comprises an invar metal.

11. An electron emission device comprising:
 a cathode;
 an insulation layer on the cathode, and an opening defined in the insulation layer and exposing the cathode;
 an electron emission source on the cathode and in the opening defined in the insulation layer;
 a mesh electrode on the insulation layer, and a combination groove defined in the mesh electrode; and an adhesion layer between the insulation layer and the mesh electrode, wherein the mesh electrode comprises:
- a mesh region corresponding to the opening defined in the insulating layer, and
- an adhesion region in which the combination groove exposes the adhesion layer.

12. The electron emission device of claim 11, wherein an upper width and a lower width of the combination groove are different from each other.

13. The electron emission device of claim 12, wherein the upper width of the combination groove is larger than the lower width thereof.

14. The electron emission device of claim 11, wherein an angle between an inner wall of the mesh electrode at the combination groove and the adhesion layer is in a range from about 90 degrees to about 130 degrees.

15. The electron emission device of claim 11, wherein the combination groove is circular-shaped or polygonal-shaped in a plan view.

16. The electron emission device of claim 11, wherein
the mesh electrode further comprises a first combination groove adjacent to the opening defined in the insulating layer, and a second combination groove further from the opening than the first combination groove, and
a shape of the first combination groove is different from a shape of the second combination groove.

17. The electron emission device of claim 11, wherein the mesh electrode further comprises:
- a plurality of mesh regions, and a first adhesion region between the plurality of mesh regions, in an overall mesh region of the mesh electrode,
- a second adhesion region outside the overall mesh region,
- a first combination groove in the first adhesion region, and
- a second combination groove in the second adhesion region.

18. The electron emission device of claim 17, wherein shapes or sizes of the first combination groove and second combination groove are different from each other.

19. The electron emission device of claim 11, wherein the adhesion layer comprises a protruded portion extending into the combination groove and combined to an inner wall of the mesh electrode at the combination groove.

20. The electron emission device of claim 11, wherein the adhesion layer comprises a glass material.

21. The electron emission device of claim 20, wherein the adhesion layer comprises glass frit or bulk metal glass.

22. The electron emission device of claim 11, wherein the electron emission source comprises carbon nanotubes.

23. An electron emission device comprising:
a cathode;
an insulation layer on the cathode, and an opening defined in the insulation layer and exposing the cathode;
an electron emission source on the cathode and in the opening defined in the insulation layer;
a gate electrode on the insulation layer, and a combination groove defined in the gate electrode; and
an adhesion layer between the insulation layer and the gate electrode,
wherein the gate electrode comprises:
an opening region corresponding to the opening defined in the insulation layer, and
an adhesion region in which the combination groove exposes the adhesion layer.

24. An electronic apparatus comprising:
an electron emission device which emits an electron beam; and
an anode spaced apart from the electron emission device, wherein the anode emits light according to a collision with the electron beam emitted from the electron emission device,
wherein the electron emission device comprises:
a cathode;
an insulation layer on the cathode, and an opening defined in the insulation layer and exposing the cathode;
an electron emission source on the cathode and in the opening defined in the insulation layer;
a mesh electrode on the insulation layer, and a combination groove defined in the mesh electrode; and
an adhesion layer between the insulation layer and the mesh electrode,
wherein the mesh electrode comprises:
a mesh region corresponding to the opening defined in the insulation layer and through which the electron beam is emitted toward the anode, and
an adhesion region in which the combination groove exposes the adhesion layer.

25. The electronic apparatus of claim 24, wherein the anode emits an X-ray and the electronic apparatus is an X-ray emission apparatus.

26. The electronic apparatus of claim 25, wherein the X-ray emitted from the anode penetrates a target object,
further comprising an imaging unit which photographs the X-ray penetrated through the target object.

27. The electronic apparatus of claim 24, wherein
a substrate structure of the electronic apparatus comprises the anode, and a fluorescent layer on a surface of the anode, and emits a visible ray, and
the electronic apparatus is a surface light source apparatus which emits the visible ray.

28. The electronic apparatus of claim 24, wherein
a substrate structure of the electronic apparatus comprises the anode, and a fluorescent layer on a surface of the anode, and emits a visible ray,
the electronic apparatus is a display apparatus comprising a pixel array, and
the pixel array comprises the cathode of the electron emission device independently operating according to pixels of the display apparatus.

29. The electronic apparatus of claim 24, wherein the electron emission device further comprises an opening defined in the mesh region of the mesh electrode and through which the electron beam is emitted toward the anode.

* * * * *